No. 644,002.  
H. B. CLUXTON.  
REVOLVING HAY RAKE.  
(Application filed Sept. 23, 1899.)  
Patented Feb. 20, 1900.
(No Model.)  
2 Sheets—Sheet 1.
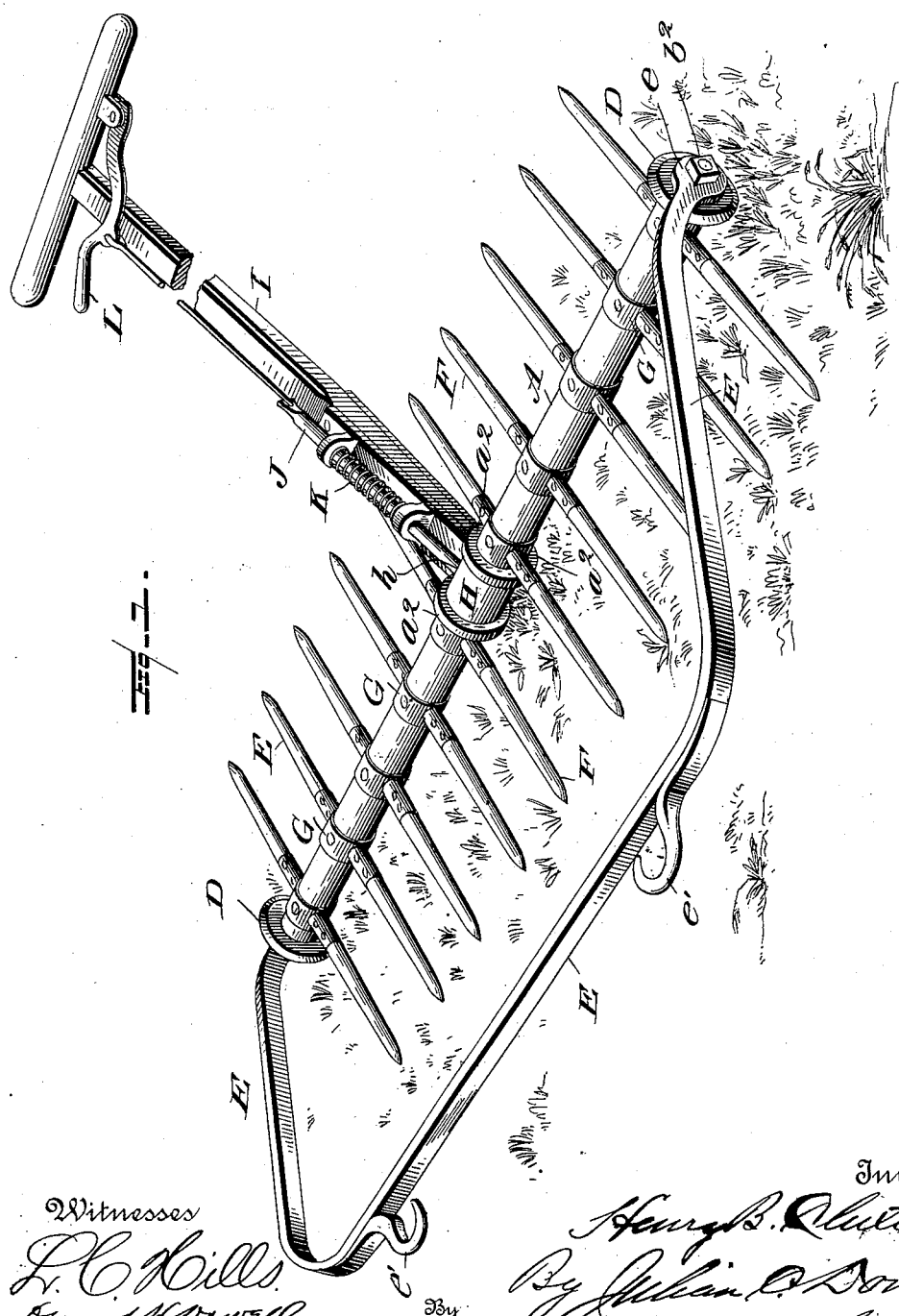
Witnesses  
Inventor  
Henry B. Cluxton  
By his Attorney
THE NORRIS PETERS CO., PHOTO-LITHO., WASHINGTON, D. C.

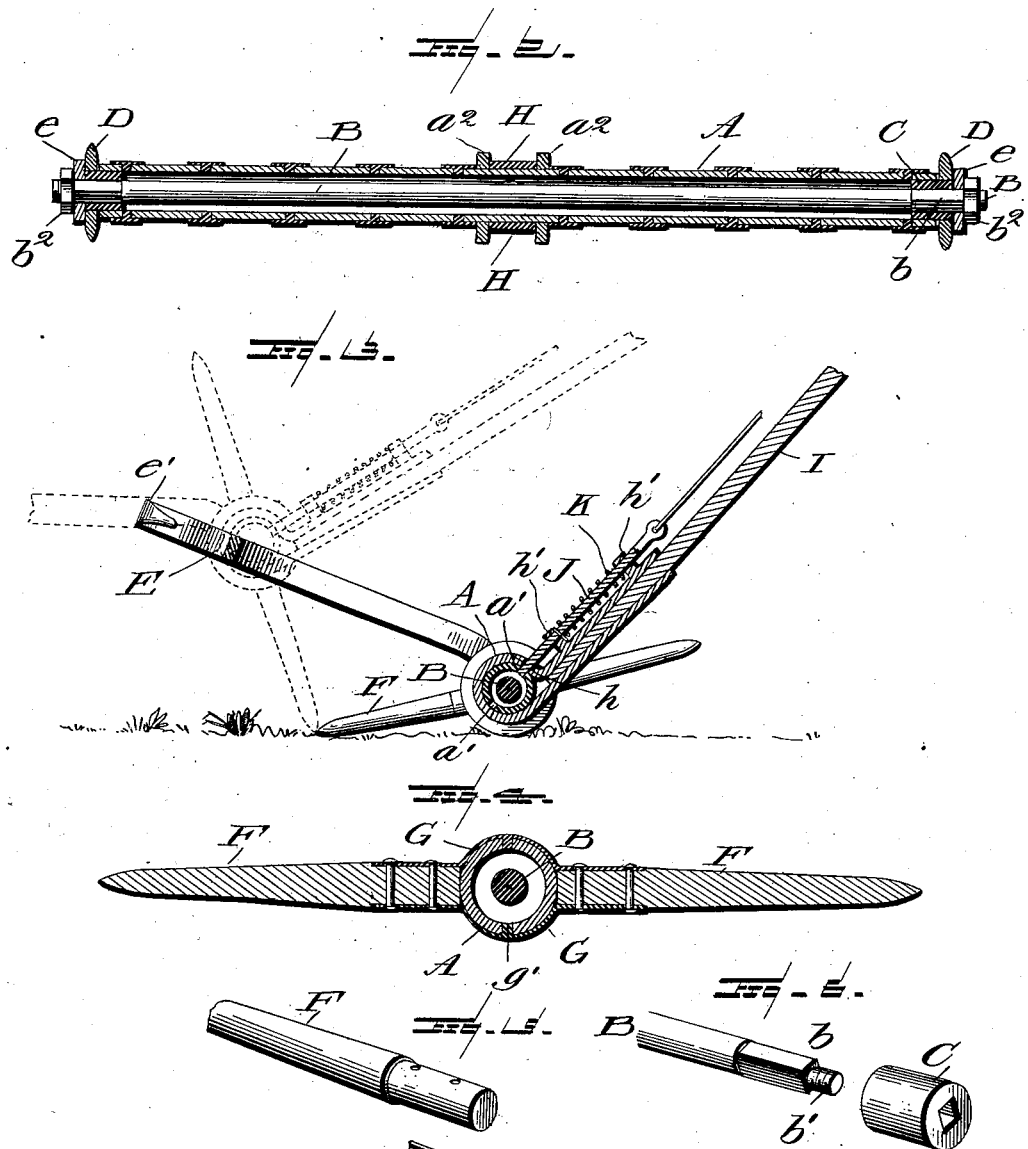

UNITED STATES PATENT OFFICE.

HENRY B. CLUXTON, OF RIPLEY, OHIO.

REVOLVING HAY-RAKE.

SPECIFICATION forming part of Letters Patent No. 644,002, dated February 20, 1900.

Application filed September 23, 1899. Serial No. 731,473. (No model.)

*To all whom it may concern:*

Be it known that I, HENRY B. CLUXTON, a citizen of the United States, residing at Ripley, in the county of Brown and State of Ohio, have invented certain new and useful Improvements in Revolving Hay-Rakes; and I do hereby declare the following to be a full, clear, and exact description of the invention, such as will enable others skilled in the art to which it appertains to make and use the same.

This invention relates to improvements in rakes, but more particularly to revolving or flop-over rakes, in which the hay is discharged by a partial rotation of the toothed revolving head.

The invention as herein described refers to rakes of the type in which the rake slides upon the ground, the rake-teeth occupying a position nearly horizontal with reference to the ground; but it is to be understood that the invention may be embodied in other types.

The objects of the invention are to provide a simple, efficient, and inexpensive revolving rake adapted to be drawn by either manual or horse power and easily manipulated for discharging a load, together with means for preventing the slipping of the rake sidewise when working on sidehill ground and means for preventing the teeth from breaking off and for easily renewing any tooth that may become worn or broken.

The invention will first be hereinafter more particularly described with reference to the accompanying drawings, which form a part of this specification, and then pointed out in the claims at the end of the description.

Similar letters of reference indicate similar parts in the different views.

In the drawings, Figure 1 is a perspective view of a rake embodying my invention. Fig. 2 is a vertical section through the axis of the rake-head. Fig. 3 is a sectional side elevation through the center of the rake, showing in dotted lines the position of the rake when revolving. Fig. 4 is a detail view, in vertical section, of two opposite rake-teeth and a cross-section of the rake-head, showing the mode of attachment of the teeth. Fig. 5 is a detail view of one of the teeth and part of an attaching-clip detached from the rake-head, and Fig. 6 is a detail of parts on which the rake-head proper or toothed revolving shaft is journaled.

The letter A in the drawings denotes a rake-head which is preferably hollow and may be cast or formed of gas-pipe, and B denotes a rod or bar of greater length than said head and passing therethrough and which may have at each end a prismatical or square portion $b$ to receive a similarly-bored cylindrical sleeve C, on which the rake-head proper or hollow shaft A revolves, though, if desired, the rod B may be of sufficient size for the head A to revolve thereon.

The sleeves or plugs C C on the ends of the rod B project beyond the ends of the shaft A sufficiently to form bearings for disks or washers D, which preferably have sharp rims, for a purpose hereinafter explained. The prismatical or square portions $b$ $b$ are also of sufficient length to receive, besides the sleeves C C, the similarly-bored ends $e$ $e$ or straps or collars thereon of the draft-bar E, which is preferably formed in a single piece and may have draft-hooks $e'$ $e'$ formed therewith or secured thereto. The rod B is further provided at each end with screw-threaded portions $b'$ $b'$ to receive the correspondingly-threaded nuts $b^2$ $b^2$, which bind the parts together.

Rake-teeth F F are attached at suitable intervals on the rake-head or shaft A in rows on opposite sides of said shaft and are secured thereto by means of tooth-clips G G, which are arranged in pairs so as to embrace opposite sides of the shaft and clamp the tooth between their projecting ends and are secured to the shaft by means of bolts passing through the teeth, as shown more clearly in Fig. 4. The semicylindrical central portions $g$ of the clips which embrace the rake-head or revolving shaft are preferably provided with teats $g'$, which fit into holes bored on opposite sides of said shaft, so as to prevent the clips from turning independently of the shaft, and the tooth-clips have also semicylindrical end portions $g^2$ $g^2$ for clasping the teeth and are provided with bolt-holes to receive the bolts which pass through holes in the shanks of the teeth, which are thus secured to said shaft.

The revolving head A may be provided at or near its center with two apertures or holes $a'\ a'$, in opposite sides thereof, and at either side of said holes with external shoulders, flanges, or washers, which may be formed integrally with the shaft or separately and secured thereto.

A strap or band H, passing around the rake-head between the flanges $a^2\ a^2$, has straight end portions, between which are clamped the rake-handle I. In that portion of strap H surrounding the revolving shaft is an aperture or hole $h$, registering with the apertures $a'\ a'$ in said shaft, and on one of the ends of the strap which clamps the handle I are apertured projections or lugs $h'\ h'$, in which is placed a sliding rod or dog J, that engages one of the apertures $a'$ in the shaft, and in which position it may be held by a spiral spring K, surrounding the rod J between the projections or lugs $h'\ h'$, and thereby prevents the rake-head from revolving. The rod J may be connected by any suitable means to a lever L on the rake-handle, adapted to be operated by the thumb or hand of the operator to release said rod J from the aperture in the revolving shaft when it is desired to revolve the rake.

By the described construction I provide a simple and efficient revolving rake which may be manufactured at a comparatively small cost and which will be found to be durable and efficient in use and any of the parts of which when worn or broken may be easily removed and a new part substituted therefor without renewing other parts. This is particularly desirable in respect of the teeth, any one of which when worn or broken by accident or otherwise may be readily removed and a new tooth substituted therefor without renewing other teeth or parts of the machine. These teeth are preferably secured between the projecting portions of the clips by means of bolts having their ends upset or riveted, as shown in the drawings; but ordinary bolts with screw-threaded nuts may be used, if desired. The use of the clips to hold separate teeth on opposite sides of the rake-head is superior to the use of a single longer tooth running through the rake-head, because the ends of said clips prevent the teeth from breaking at the head, while if a tooth should become broken or warped from any cause it can be easily withdrawn and another inserted in its place. The disks or wheels D D may be of any desired size, or they may be dispensed with, but are preferably used to prevent the rake from slipping on steep sidehill ground. Other obvious changes may be made in the details of construction and arrangement of parts without departing from the spirit and scope of my invention, and hence I do not desire to be limited to the exact construction and arrangement of parts described and shown.

The operation of the machine will be readily understood from the foregoing description in connection with the accompanying drawings. As the rake is drawn along by hand or horse power with the points of the foremost series of teeth slightly inclined downward in such position as to take under and collect the hay or other material lying on the surface of the ground it will be held in proper position to perform its work by means of the handle I, which is normally held in locking engagement with the revolving shaft A by the described locking device, and when the rake has gathered up a sufficient load the latter may be readily discharged by operating the thumb-piece or hand-lever L, so as to withdraw the dog J from engagement with the hole in the shaft A, thus releasing or unlocking the shaft, whereupon the points of the teeth by engaging the ground will cause the rake to make a half-revolution and discharge the load, and the lever L having been released in the meantime the spring-actuated rod or dog J will automatically engage the opposite aperture in the shaft A and lock the latter in the desired position to cause the rake to gather another load.

Having thus described the invention, what I claim, and desire to secure by Letters Patent of the United States, is—

1. In combination with the hollow toothed shaft, and its operating-handle, means for locking the latter to said shaft and releasing the same at will, the rod passing through said shaft having polygonal end portions, the sleeves fitting over the polygonal portions of said rod, and extending partly without and partly within the hollow shaft, a suitable draft-bar and means for securing the several parts together, substantially as described.

2. In combination with the hollow toothed shaft and its operating-handle, means for locking the latter to said shaft, and releasing the same at will, the rod passing through said shaft having polygonal end portions, the sleeves fitting over the polygonal portions of said rod, and extending partly without and partly within the hollow shaft, the disks journaled on the projecting portions of said sleeves, a suitable draft-bar, and means for securing the several parts together, substantially as described.

3. A rake of the character described, comprising a bifurcated draft bar or frame having its arms fixedly connected to the ends of a connecting-rod, a tubular shaft revolubly journaled on said rod and through which the latter extends; said shaft being provided with a series of teeth projecting from opposite sides thereof, a handle pivotally connected at one end to said shaft, a spring-actuated dog carried by said handle, adapted to automatically engage the shaft, and lock the handle thereto, and means for actuating said dog so as to release the shaft at will, substantially as described.

4. The combination, in a revolving rake, of a hollow shaft having a series of teeth projecting from opposite sides thereof, a rod or bar extending through said shaft, and provided at its ends with polygonal portions on which are fitted removable sleeves or plugs on which said shaft has its bearings, a suitable draft-bar having its rear ends secured to said rod, and means for confining the latter to the rod, and securing the several parts together, substantially as described.

5. In combination with the revolving rake-head or shaft, a tooth-holding clip composed of two parts each having its intermediate portion arranged to partially embrace said shaft and each provided with projecting end portions extending in opposite directions from the shaft, between which projecting end portions the shanks of oppositely-extending teeth are clamped and removably secured, substantially as described.

6. In a revolving rake having teeth projecting in opposite directions from the rake-head, means for securing the teeth to said head, consisting of tooth-holding clips constructed in two parts, each part having its intermediate portion adapted to partially embrace the tooth-holding shaft or bar and having end portions which project in opposite directions therefrom; said end portions facing the correspondingly-projecting ends of the other part of the clip, and a tooth at each side of the bar having its shank fitted between opposed projecting end portions of said parts, together with bolts passing through the clip ends and tooth-shank for securing the bar, clip and teeth together.

7. A revolving rake comprising a bifurcated draft-bar having its branches secured to the ends of a rod forming the axis of the rake-head, a hollow shaft suitably journaled on said rod, a series of teeth projecting from opposite sides of said shaft, an operating-handle pivotally connected at one end with said shaft, and means for locking the shaft thereto so as to prevent rotation of the latter in the normal position of the parts, together with means for unlocking or releasing the shaft to permit a partial rotation thereof at will, and for automatically locking the handle to the shaft after a partial rotation thereof, substantially as described.

8. In a rake, the combination with the rake-head or shaft, of a tooth-holding clip composed of two parts having intermediate substantially semicircular portions adapted to partially encircle said shaft with a teat for engaging the shaft to prevent rotation of the clip thereon, and substantially semicircular perforated end portions extending in opposite directions from the shaft and adapted to receive and confine between them the shank of a tooth which may be removably secured thereto by bolts passing through said perforated end portions of the two parts of the clip and the shank of the tooth, substantially as described.

In testimony whereof I affix my signature in presence of two witnesses.

HENRY B. CLUXTON.

Witnesses:
B. L. SIDWELL,
GEO. M. GERMAN.